US006437974B1

(12) United States Patent
Liu

(10) Patent No.: US 6,437,974 B1
(45) Date of Patent: Aug. 20, 2002

(54) FREESTANDING ELECTRONIC PRESENTATION SYSTEM

(75) Inventor: Fusheng Liu, Wayne, NJ (US)

(73) Assignee: Mitsui Comtek Corp., Basking Ridge, NJ (US)

( * ) Notice: Subject to any disclaimer, the term of this patent is extended or adjusted under 35 U.S.C. 154(b) by 0 days.

(21) Appl. No.: 09/576,923

(22) Filed: May 23, 2000

(51) Int. Cl.$^{7}$ .................................................. G06F 1/16

(52) U.S. Cl. ....................... 361/681; 361/682; 248/917; 248/923; 345/905; D14/375; D14/447

(58) Field of Search ................................ 361/681, 682; 248/917–924; 345/903, 905; D14/375, 447, 100

(56) References Cited

U.S. PATENT DOCUMENTS

D290,702 S * 7/1987 Stern et al. ................ D14/100
4,846,694 A 7/1989 Erhardt
5,041,965 A 8/1991 Chen
D323,324 S * 1/1992 Suda ......................... D14/125
5,100,098 A * 3/1992 Hawkins ..................... 248/917
5,128,829 A * 7/1992 Loew ......................... 361/680
5,375,076 A * 12/1994 Goodrich et al. ........... 361/680
5,390,246 A 2/1995 Gay et al.
5,539,658 A 7/1996 McCullough
5,568,358 A * 10/1996 Nelson et al. .............. 361/681
5,647,484 A 7/1997 Fleming
5,666,273 A * 9/1997 Kurcbart ..................... 361/681
5,682,182 A * 10/1997 Tsubosaka .................. 361/680
5,777,704 A * 7/1998 Selker ........................ 361/680
5,793,606 A 8/1998 Cubbage et al.
5,796,575 A * 8/1998 Podwalny et al. .......... 361/681
5,856,819 A 1/1999 Vossler
5,986,634 A 11/1999 Alioshin et al.
5,986,737 A 11/1999 Evanicky et al.
6,034,866 A * 3/2000 Nobuchi et al. ............ 361/681
6,050,535 A 4/2000 Kang
6,256,192 B1 * 7/2001 Shannon ..................... 361/683
6,266,241 B1 * 7/2001 Van Brocklin et al. ..... 361/680

* cited by examiner

*Primary Examiner*—Darren Schuberg
*Assistant Examiner*—Lisa Lea-Edmonds
(74) *Attorney, Agent, or Firm*—Baker Botts L.L.P.

(57) ABSTRACT

A portable electronic presentation system is provided with a LCD display panel that is ultrathin, ultralight, and capable of freestanding operation.

1 Claim, 2 Drawing Sheets

FREESTANDING ELECTRONIC PRESENTATION SYSTEM

BACKGROUND OF THE INVENTION

Personal computers, especially portable personal computers, as well as other image projection and display equipment have greatly increased the ability of a presenter to communicate effectively and transfer large amounts of information in a face-to-face meeting. Portable personal computers typically have a flat display screen or monitor that is hinged to the computer base to provide a folding cover and close up the computer and screen in a protected book form.

A major problem facing the presenter in a small meeting setting, for example of two to about ten persons, is the ability to display the information to be presented in any location, without the need for expensive and specialized overhead projection equipment. For example, the "road warrior" needs to travel to the viewers' location under a flexible itinerary, and be able to make the presentation in any setting. Advance planning for the presentation may not be possible. Currently available presentations systems do not have this flexibility. For example, U.S. Pat. No. 5,041,965 describes a laptop computer with a detachable display that can be used as a transparency for an overhead projection system. Also, U.S. Pat. No. 4,846,694 describes a computer terminal having a projection module supported on an overhead projector with an LCD display mounted parallel to the illumination window of the overhead projector. Such overhead projection systems typically require advance planning and viewer equipment for the presentation.

A second problem for the presenter is to display information to the viewers while simultaneously viewing the information on a personal computer so that the distance between the viewers and presenter can be adjusted in an interactive meeting. The presenter then has the option to display all or a limited portion of the information to the viewers based on the interaction.

Various types of displays currently exist for the presenter. For example, U.S. Pat. No. 5,390,246 describes a hand-held monitor to be used by a viewer receiving a presentation which employs, for example, a Sharp 6M-40U LCD color monitor. The hand-held monitor is connected to a portable multimedia marketing system. The monitor and other components of the multimedia marketing system are contained in a specialized portable carrying case.

Various other displays have been designed for freestanding operation. For example, U.S. Pat. No. 6,050,535 describes a freestanding flat panel display that rotates on a stand. The stand has a circular recess to support the display and provide space for a ring-shaped rotation member and other components which rotatably attach the display to the stand. The stand has a bulky circular base to provide stable support for the display.

In another example, U.S. Pat. No. 5,793,606 describes a presentation system based on a modified portable personal computer with a detachable display formed with a hinge that allows the angle of the display to be adjusted. The detachable display does not allow simultaneous viewing from different locations or angles. Also, the presenter and the viewers must use the same display panel.

In another example, U.S. Pat. No. 5,856,819 describes a bi-directional presentation device for a modified laptop computer comprising attached front and rear display screens positioned so that their image surfaces face in opposite directions. The device can simultaneously display images to viewers seated on opposite sides of the device. Front and rear protective covers may be hinged to the displays, which can be rotated downward through an angle of 90° to function as a stand. The presenter and the viewers must use the same dual display panel device in fixed proximity to each other.

In another example, U.S. Pat. No. 5,986,634 describes a display comprising a base unit that can be mounted to furniture or sit on top of a surface. The display is rotatably connected to the base unit, and can rotate about 90° from a closed position parallel to the base unit. The base unit comprises circuitry and a sensor for determining the orientation of the display in relation to the base to make adjustment of the image for proper viewing.

What is needed is a lightweight portable freestanding LCD display with a protective cover that can be pivoted to form a stand for the display, that is suitable for use with a personal computer, especially a portable personal computer, and can be used to make interactive presentations to a small group of viewers in any location.

SUMMARY OF THE INVENTION

The limitations of current technology described above are overcome by this invention, which relates to an electronic presentation system that in one embodiment comprises a LCD display panel having a light-emitting face, LCD display panel operating circuitry, a power supply for the LCD display panel and operating circuitry, a housing for the LCD display panel and operating circuitry, and a cover stand which is hinged to the housing. The cover stand can be pivoted about the hinge from a first non-supporting position in which the cover stand is in an adjacent parallel plane to the light-emitting face of the LCD display panel to a second supporting position in which the cover stand supports the housing, in which the cover stand is pivoted through an angle ranging from greater than 0° to about 360°.

In another embodiment, the electronic presentation system further comprises a data input device and a cable connecting the data input device to the LCD display panel circuitry. The data input device may be, for example, a notebook personal computer, a hand-held personal computer, or a wireless device such as a cellular telephone.

In further embodiments, the hinge may be a piano hinge, a flexible hinge, or an o-ring hinge.

In further embodiments, the bottom edges of the housing and cover stand may be coated with non-slip trim material or comprise trim material.

In another embodiment, this invention is an electronic presentation system comprising a plurality of attached LCD display panels.

For a better understanding of this invention and its objects, reference is made to the following description to be considered in light of the complete application, and the scope of this invention as pointed out in the appended claims.

DETAILED DESCRIPTION OF THE INVENTION

Figure 1:
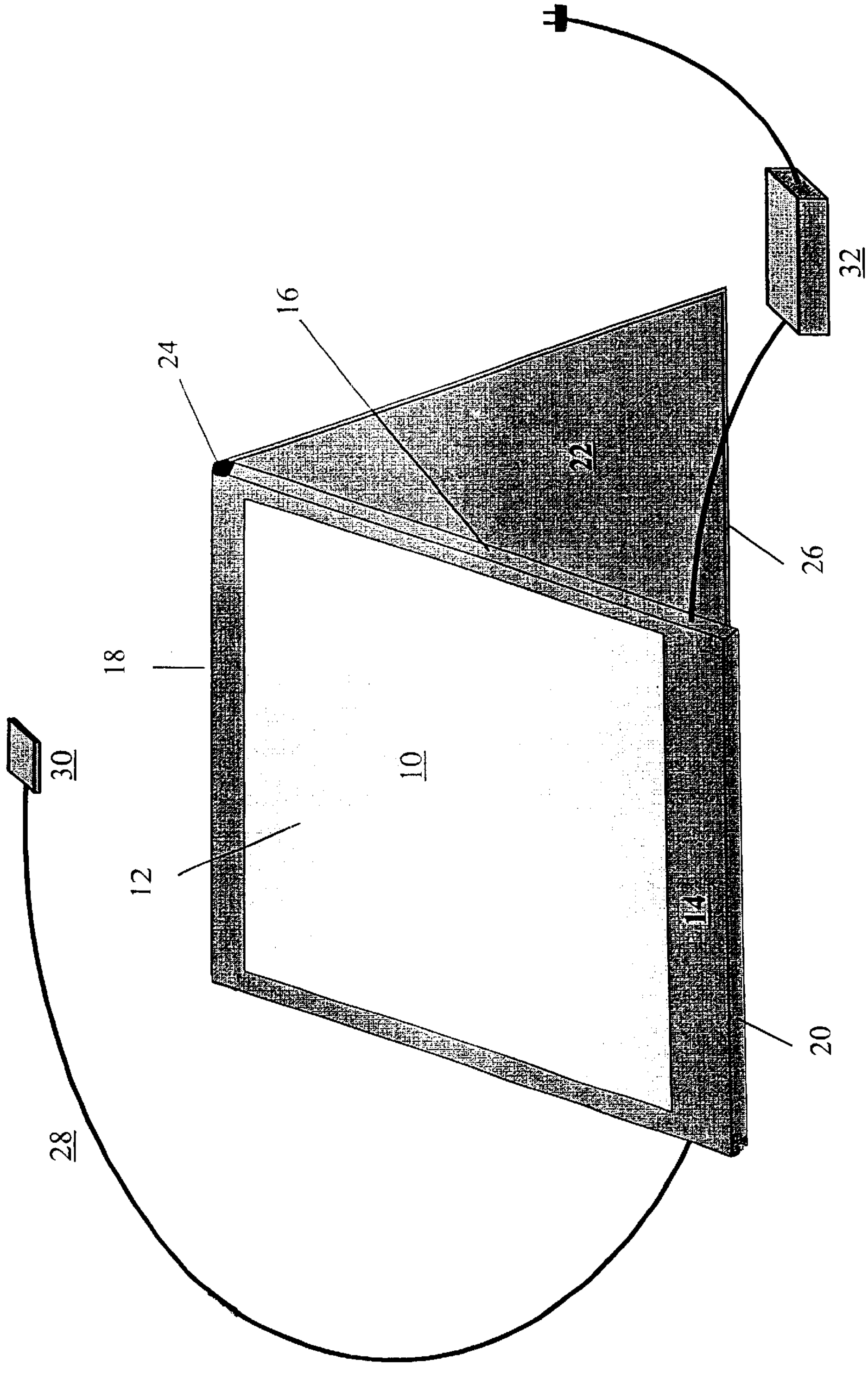
FIG. 1 is a view of an embodiment of the freestanding electronic presentation system of this invention.

This invention is an electronic presentation system comprising a portable LCD display panel, such as a Thin Film Transistor (TFT) LCD display panel, that is ultrathin, ultralight, and capable of physically freestanding and electronically standalone operation. The ultrathin and ultralight features make it suitable for portability, especially in combination with a portable personal computer.

The portable electronic presentation system is designed for "road warriors" for use with a portable notebook computer for interactive presentations to a viewing audience of up to about ten persons. An interactive presentation made with a conventional display, for example the display attached to a personal notebook computer, is hampered by the need for the presenter and viewers to crowd around the dim display of the portable computer. This orientation does not allow the presenter the face-to-face contact for an interactive presentation. Further, it does not allow the presenter to modify the quality or quantity of information being presented to the viewers on the basis of the interaction, for example, upon receiving the reaction and feedback of the viewers to the information presented. These types of interactions are critical to presentations, especially those conducted at arm's length such as for competitive sales and contracts.

Another problem for presenters is that advance planning and communication is required for using viewers' in-house equipment to make presentations. For example, if the viewers do not have a meeting room with an overhead projection system, then the presenter must transport this bulky equipment.

The portable electronic presentation system described here solves these problems by allowing flexibility in orientation. First, the presenter is not forced to use in-house equipment. The portable electronic presentation system allows meetings and presentations to be conducted almost anywhere. Preferably, a indoor setting with controlled lighting is used.

Second, the portable electronic presentation system, when employing for example a TFT LCD display panel, allows a wider view angle and brighter picture than conventional LCD displays. TFT is a type of active matrix LCD display which provides a more responsive image at a wider range of viewing angles with respect to the plane of the display screen than the conventional Super Twisted Nematic (STN) display. This allows viewers to assemble in a wider range about the light emitting face of the display, and gives the presenter more flexibility where to place the data input device at which she is located. The system has complete flexibility and also allows the presenter to choose between locations either facing the viewing audience, or side by side with the viewers, or even behind the viewers. Further, it is important that the distance between the presenter and the viewers can easily be adjusted.

An illustrative, but not limiting example of a TFT LCD panel that may be used in this invention is a Tottori Sanyo TM-151XGA module.

The portable electronic presentation system is ideal for executives and employees in sales, marketing, and other business development to make presentations to clients. It can serve additional uses such as for internet surfing, online books and mail, maps, games, and televisions. It may also serve as a alternate second display for personal computer information. Additionally, it may serve as an "electronic picture frame" display for camera, digital camera, and camcorder images. Also, it may be used for internet video telephony.

Shown in FIG. 1 is an embodiment of a electronic presentation system comprising an LCD display panel 10 having a light-emitting face 12, a housing 14, a cover stand 22, and a hinge 24. The housing for the LCD display panel provides a covering and container for the light emitting LCD panel and its operating circuitry. The housing is ultrathin, less than about two centimeters, and is made from thermoplastic, metal, or other material known to those of skill in the art of electronic devices. The housing is connected by a hinge 24 to a cover stand 22. The cover stand has approximately the same planar dimensions as the housing, and when not in use rests adjacent to the plane of the housing to protect the LCD display panel screen. Optionally, the cover stand has the planar dimensions of the LCD display panel light-emitting face 12. The housing may optionally comprise a latch for securing the cover stand to the face of the housing, for example by using a magnetic material, VELCRO, or a mechanical pressure-lock.

The hinge 24 connects the cover stand 22 to the housing 14. In one embodiment, the cover stand is hinged to the top edge 18 of the housing, the top edge being defined as corresponding to the top edge of the image portrayed by the LCD display. The cover stand can be pivoted about the hinged edge from a first non-supporting position in which the cover stand is in an adjacent parallel plane to the light-emitting face of the LCD display panel to a second supporting position in which the cover stand supports the housing, where the cover stand is pivoted through an angle ranging from greater than 0° to about 360°. Illustrative examples of the type of hinge used for this rotation include a stiff or spring-loaded piano-type hinge, a ball and groove type hinge, or other hinges as are known to those of skill in the art. In another example, the hinge may comprise at least one o-ring or oval ring which is secured to the top edge of the housing or passes through the top edge of the housing. This allows the cover stand to pivot or rotate smoothly through an angle of from greater than 0° to about or less than 360°. In a further example, the hinge may comprise a cloth or flexible plastic material, which may be reinforced with metal or plastic,-that allows rotation of from greater than 0° to about or less than 360°.

As illustrated in FIG. 1, in operation the cover stand 22 is pivoted to the open position to form a support stand with the housing 14, allowing the display to be placed almost anywhere for freestanding operation. The bottom edge 20 of the housing may, for example, be adapted with trim such as a non-slip coating or rubber feet to provide stable support. Likewise, the bottom edge 26 of the cover stand may be so adapted.

The housing may be, for example, an injection molded thermoplastic or thermoformed article, which may consist of two halves fastened together to contain the LCD display panel. The cover stand will have sufficient rigidity to protect the screen of the LCD display while in transport, and may, for example, be constructed of metals such as aluminum, titanium, magnesium, and the like, or may be an engineering plastic. The cover stand may optionally be constructed of reinforced flexible materials, such as paperboard reinforced plastic or vinyl, and may carry decorative designs or have openings in any shape through which the LCD screen may be visible.

In further embodiments, the cover stand may be hinged to the side edge 16 of the housing. This allows an alternative orientation of the support stand formed by the cover stand. It further allows combining a plurality of displays in side by side accordion fashion, or triangular fashion, which increases the flexibility of the presentation.

The portable electronic presentation system is connected to the data input device by a cable 28, as shown in FIG. 1.

The data input device may be, but is not limited to a portable personal computer, cellular phone, wireless or other modem, or other hand-held computer. The cable will carry a connector 30 matched to the data input device. The panel is powered by an AC power supply 32 or optionally, a battery pack.

Figure 2:
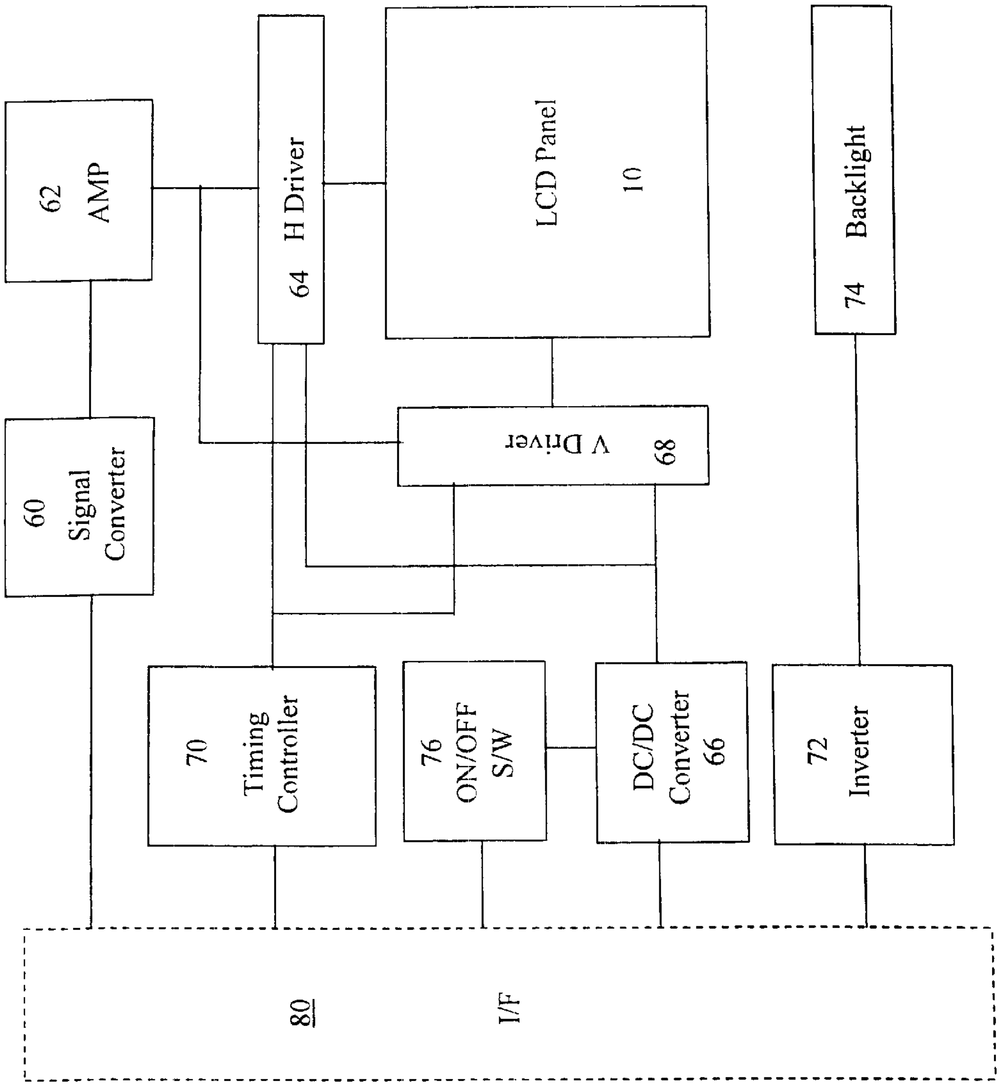
FIG. 2 is a diagram of an embodiment of the LCD display panel operating circuitry of this invention.

The LCD display may be interfaced to the data input device, for example, by a standard PC display driver, a diagram of which is shown in FIG. 2. As known to those of skill in the art, it comprises a signal converter 60 and amplifier 62 feeding a horizontal Driver 64 (H Driver) and vertical Driver 68 (V Driver). It further comprises a DC/DC converter 66, a timing controller 70 which clocks both the horizontal and vertical drivers of the LCD display panel 10, and an inverter 72 driving a backlight 74 for the LCD panel. The LCD display panel is provided with an on/off switch 76. As known to those of skill in the art, the input signals are provided by the interface 80 (I/F) of the data input device.

The interface 80 may optionally be a standard RGB, a PCMCIA card (LVDS, GVIF, TMDS), a USB, or an IEEE 1394. As known to those of skill in the art, such drivers are typically supported by MS Windows, and other software operating systems.

In further embodiments, the interface 80 may optionally be wireless or broadcast, which allows for a greater distance adjustment by the presenter.

The description of the invention as given above is meant to be illustrative, rather than to limit the invention. While there have been described illustrative embodiments of this invention, those skilled in the art will recognize that they may be changed or modified without departing from the spirit and scope of this invention, and it is intended to claim all such changes and modifications that fall within the true scope of the invention as set forth in the appended claims. All documents referenced herein are specifically incorporated by reference in their entirety.

The invention claimed is:

1. An electronic presentation system comprising:

a LCD display panel having a light-emitting face;

a housing which contains the LCD display panel;

a cover stand for the housing;

a hinge pivotably connecting the cover stand to the housing to allow the cover stand to be pivoted to support the housing, in which the cover stand is pivoted at the hinge from a first non-supporting position wherein the cover stand is in a substantially adjacent parallel plane to the light-emitting face of the LCD display panel to a second supporting position where the cover stand supports the housing, and wherein the cover stand is pivoted through an angle ranging from greater than 0° to about 360°;

further comprising a data input device which is connected to the LCD display panel either by cable or by wireless connection in which case said data input device is a wireless computer or cellular telephone.

* * * * *